(No Model.)
J. W. COONEY.
PIPE FITTING APPARATUS.
No. 519,568. Patented May 8, 1894.
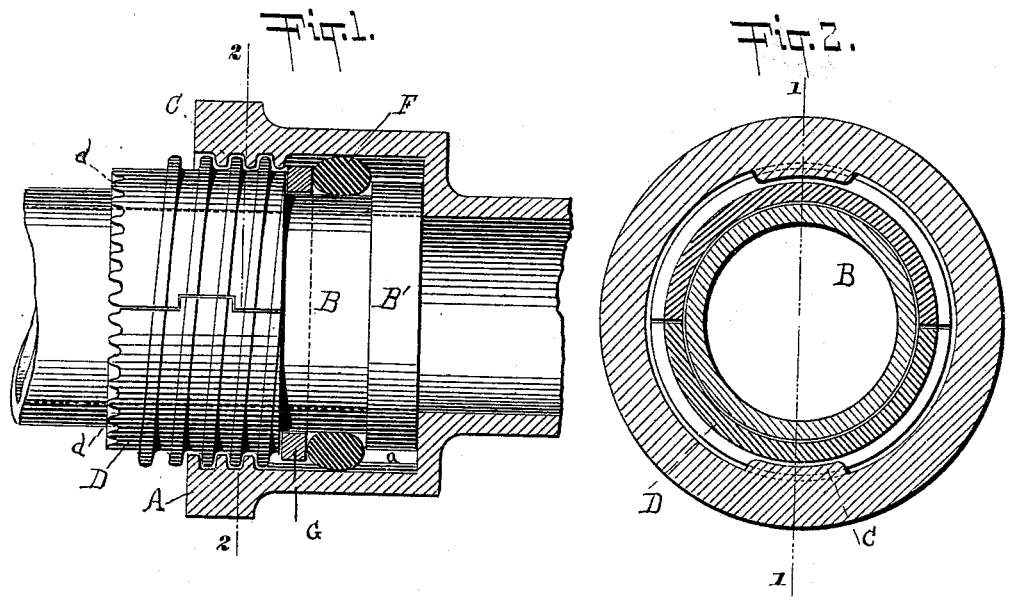
WITNESSES:
INVENTOR
John W. Cooney
BY
ATTORNEYS.

United States Patent Office.

JOHN W. COONEY, OF NEW YORK, N. Y.

PIPE-FITTING APPARATUS.

SPECIFICATION forming part of Letters Patent No. 519,568, dated May 8, 1894.

Application filed February 17, 1893. Serial No. 462,694. (No model.)

*To all whom it may concern:*

Be it known that I, JOHN W. COONEY, a citizen of the United States, residing at New York, in the county and State of New York, have invented certain new and useful Improvements in Pipe-Fitting Apparatus, of which the following is a specification, reference being had therein to the accompanying drawings.

The objects of my invention are, first, to provide a coupling for pipes which will endure the strain to which the pipe may be subjected from the contents thereof, the side strain or lateral pressure due to the settling of buildings or the sagging of the pipe supports, and which may be conveniently, speedily and securely adjusted. I attain these objects by the devices illustrated in the accompanying drawings, in which similar letters of reference indicate similar parts throughout the various views.

Figure 1 is a central longitudinal sectional view of my improved pipe joint or coupling. Fig. 2 is a transverse sectional view on the line 2—2 of Fig. 1. Fig. 3 is a face view of the split ring G.

The present mode of joining cast-iron and other pipes and fittings is usually to insert the bead or spigot end of one section into the bowl or hub end of the other section and make a calked joint. Should the building or structure in which the pipes so connected and lead-calked are situated, settle somewhat, as is almost invariably the case, the side strain brought upon the joints by the settling will bend the pipe at the joints and cause the packing to be compressed on one side of the joint and opened on the other, thus producing leaks where before a tight joint existed. In some cases the strain is so great as to break the pipe unless there is some portion of the joint capable of yielding.

My invention consists of a device whereby the sagging or bending of the pipe at the joints is permitted without danger of leakage or injury to the coupling and whereby the joint is rendered as strong as the pipe itself in withstanding pressure from the contents thereof.

I will describe my invention as applied to cast-iron pipes as they are usually used in cases where high pressure is to be withstood, though I do not limit myself to this application.

A designates the bowl end of a cast-iron pipe, and B the spigot or bead end of another section of pipe inserted in the bowl end of the first named section. The sections of pipe are of the usual structure except that the bowl for the purpose of my invention is cast with a number of screw threads, C, on the inside at the mouth of the bowl. These screw-threads are employed for the purpose of receiving and holding a threaded thimble or hollow nut, D. These screw-threads, C, may be made discontinuous for convenience of manufacture, it being easier and safer to form partial threads in the molds than to produce continuous ones. The hollow threaded thimble or nut, D, may be formed in two sections, so as to be easily applied to the spigot end of a beaded pipe, so as to embrace the same closely; one of such sections having a rectangular recess on each of its abutting edges and the other of said sections having a tenon on each edge to enter the recess on the first-named section, so as to preserve the proper relative position of the two sections. And further said thimble, D, may be made of lead so that when screwed down with force it will squeeze out and form a close union with the bowl, A. Said thimble, D, should be provided with some suitable means, such as the projection, *d*, for turning it. Of course I do not limit myself to any of these details of construction.

F, designates a gasket adapted to encircle the section B, immediately above or back of the bead B'. It may be made of any suitable material that may be squeezed down into the space *a*, of the bowl A, as thimble D, is screwed down, but I prefer to make it of rubber or similar elastic material.

G, is a metallic ring applied to the section, B, between the gasket, F, and the thimble, D, to protect said gasket from said thimble as it is screwed down. Said ring G, may be made in two parts as shown, so as to be easily applied to said section B.

In coupling pipes according to my invention the gasket, F is first slipped over the bead of section B and this section is then inserted in the bowl of section A. The metallic ring, G, is then applied to the section B, back of the gasket and the threaded thimble or nut D next adjusted upon the pipe B and screwed into the bowl of section A, until it contacts with the ring G, and presses the same strongly against the gasket F, causing the latter to spread against the surfaces with which it is in contact and be squeezed down into the space $a$, thereby producing a tight and elastic joint. The joint may be further tightened up at pleasure to compensate for any contraction of the gasket, or the pipe sections may be entirely disconnected.

It is not necessary for the purpose of my invention to change the existing patterns of cast-iron pipes and fittings, as the threads on the interior of the bowl may be provided for by making suitable impressions in the mold after the patterns have been withdrawn.

Porcelain-lined or enameled pipes and fittings may be used without chipping the enamel.

What I claim, and desire to secure by Letters Patent, is—

1. In a pipe-coupling, the combination of a section having an interiorly-screw-threaded integral bowl and a section having a beaded spigot end with an elastic gasket fitted on the spigot end behind the bead, a split ring surrounding the spigot end adjacent to the gasket, and an exteriorly-screw-threaded split thimble or nut screwing into the bowl and abutting against the said split ring, substantially as described.

2. In couplings for cast-iron pipes, the combination, with the beaded spigot end B, gasket F, and threaded split thimble or hollow nut D, of the bowl end or section A, formed with mutilated or discontinuous threads on its inner surface for the engagement of the threaded thimble, substantially as described.

In testimony whereof I affix my signature, in presence of two witnesses, this 6th day of February, 1893.

JOHN W. COONEY.

Witnesses:
KATE C. COONEY,
WM. GILPIN.